Feb. 14, 1961  R. SCHÖN  2,971,586

ROTOR HUB FOR HELICOPTER AIRCRAFT

Filed April 2, 1957

INVENTOR.
Richard Schön

United States Patent Office 2,971,586
Patented Feb. 14, 1961

2,971,586

ROTOR HUB FOR HELICOPTER AIRCRAFT

Richard Schön, Prague, Czechoslovakia, assignor to Vyzkumny a zkusebni letecky ustav, Letnany, near Prague, Czechoslovakia Filed Apr. 2, 1957, Ser. No. 653,725

6 Claims. (Cl. 170—160.56)

The present invention relates to improvements in rotor hubs for helicopters to enable the rotor blades to rotate with constant angular velocity when the plane of rotation is inclined to the drive shaft due to blade flapping.

Rotor hubs of helicopters are generally fastened firmly on the rotor shafts and the rotor blades are hinged thereon either for individual swinging about a horizontal flapping axis and about a vertical lagging axis or the blades are mounted, without the possibility of individual flapping, on a common beam, which is hinged by a universal joint to the fork of the hub. The blades with individual horizontal and vertical hinges have the advantage over the blades which cannot flap individually that the butt arms of the blades are not so highly stressed by bending and at least partially prevent vibrations due to swinging around the lagging hinge in the plane of rotation, which vibrations result from the irregular angular velocity of the rotor blades during forward flight and the consequent acceleration and deceleration of the mass of the blades caused by the deviation of the rotor axis with respect to the axis of the drive shaft.

However, when the blades are mounted for individual rocking about horizontal and vertical hinge axes, it is impossible to suppress the cyclic vibrations of the rotor due to the small mass of the blades, due to changing aerodynamic conditions of the blades during the whole cycle and due to the influence of damping of the blade lagging around the vertical hinge axis. This damping of the oscillations of the blades is necessary in order to prevent the possibility of the occurrence of ground resonance of the whole rotary wing aircraft, which may be caused by a lateral bumping of the landing gear against the ground when touching the ground or some other reason, whereby the rotor blades may deviate unsymmetrically around their vertical hinge axes. The centrifugal forces of the blades do not compensate for each other in this asymmetrical position of the rotor blades and the resultant unbalanced force excites oscillations of the whole aircraft and causes mechanical instability. In case the rotary wing aircraft, when touching the ground has its own oscillating frequency equal or near to the rotational speed of the rotor multiplied by the number of rotor blades, the unbalanced force of the rotor blades may cause resonant oscillations of the whole aircraft, even when the blade movements are damped. These resonant oscillations may cause damage to the machine and create a dangerous condition for the crew and the attendants on the ground.

When the rotors are mounted on a common balancing beam suspended on the rotor shaft by means of a universal joint, the ground resonance does not occur, but the vibrations occurring during flight as a result of the non-uniform angular speed of the rotor blades are considerable.

From the dynamic point of view the rotor including the main rotor blades represents a body having a considerable moment of inertia with respect to the axis of rotation, which tends to maintain a uniform rotational speed. Similarly, the whole driving mechanism, including the flywheel and the driving engine, tends to maintain its uniform rotational speed and, in case of a deviation of the axis of the rotor disc with respect to the axis of the rotor shaft due to the cyclic control, the universal joint causes a non-uniformity of the angular speed between the driving system and the rotor. As the energy of the rotor resistance overcomes the high speed engine with the flywheel, it may be assumed that the rotor shaft will have a larger dynamic inertia than the deviated rotor and that therefore it will maintain a more uniform rotating speed. This non-uniformity of the rotating speed of the deviated rotor causes considerable inertia forces to be produced in the rotor blades, which result in shaking of the rotary wing aircraft and, in addition, these dynamic forces tend to bring the rotor into a plane perpendicular to the axis of the rotor shaft, that is, into the plane of the supposed uniform angular speed of the driving system. Therefore, such a rotor has small stability in its deviated position and requires some more substantial stabilizing means.

A further disadvantage of the common balancing beams supporting the rotor blades is their solid connection with the central rotor part which is arranged in a joint suspension on the rotor shaft. In this case the blade supports must, by their rigidity, transmit the variable bending stresses not only for any change of the flying conditions and the carried load and in case of vertical atmospheric disturbances, but even during each revolution of the rotor in normal forward flight. Thus, the rotor blade is stressed by the variable aerodynamic forces, which act at a different location on the blade during each revolution and simultaneously the blade is subjected to the dynamic forces of its mass, that is, to centrifugal and inertia forces, and this stress is rather disadvantageous to the rotor from the point of view of its strength. Further, such a rotor does not possess the ability to damp the cyclic variability of the motor torque, and such variation of the torque produces vertical vibrations which are inconvenient during forward flight.

The ideal conditions are achieved, in accordance with this invention, when the rotor is suspended on the rotor shaft by a double universal joint, which permits equal rotational speed of the shaft and of the deviated rotor, and the blades are attached to this double universal joint only by horizontal pins. This arrangement prevents the occurrence of the undesirable vibrations due to the variable rotational speed of the rotor blades and further prevents any mechanical instability of the rotary wing aircraft during flight and especially upon landing. This mechanical instability would otherwise, under certain stress conditions, cause a resonant state in which the craft becomes uncontrollable and may threaten the safety of the crew and of the aircraft. The rotor blades are free to flap around their horizontal pins without obstructing the functioning of the double universal joint so that the blades are less stressed in the plane of their flapping movement and such flapping increases the stability or smoothness of the flight.

The rotor head according to this invention has a double universal joint with two concentric cross systems of diametrically opposed pins, and which secures an equal angular speed of the driving shaft and of the rotor disc which is deviated by the cyclic control from the axis of the rotor shaft and provided with a forced tilting of both diametrically opposed pins.

The continuous teetering beam of the rotor blades is formed by a central frame which is hinged upon the double universal joint and bears two or more blades on horizontal hinges. Each blade is connected by a link with a two armed lever which is centrally disposed on the central frame and thus sets itself symmetrically with respect to the frame. This rotor system with the double universal joint rotor head ensures that the rotor will have the same annular speed as the driving rotor shaft under all conditions. For this reason the dynamic forces acting upon the revolving rotor blades do not tend to force this rotor into a plane perpendicular to the axis of the shaft, as is the case with rotors with a single universal joint. Therefore, the rotor has an increased stability in all positions when compared with other systems.

An illustrative embodiment of the invention is shown by way of example in the accompanying drawing, in which.

Figure 1:
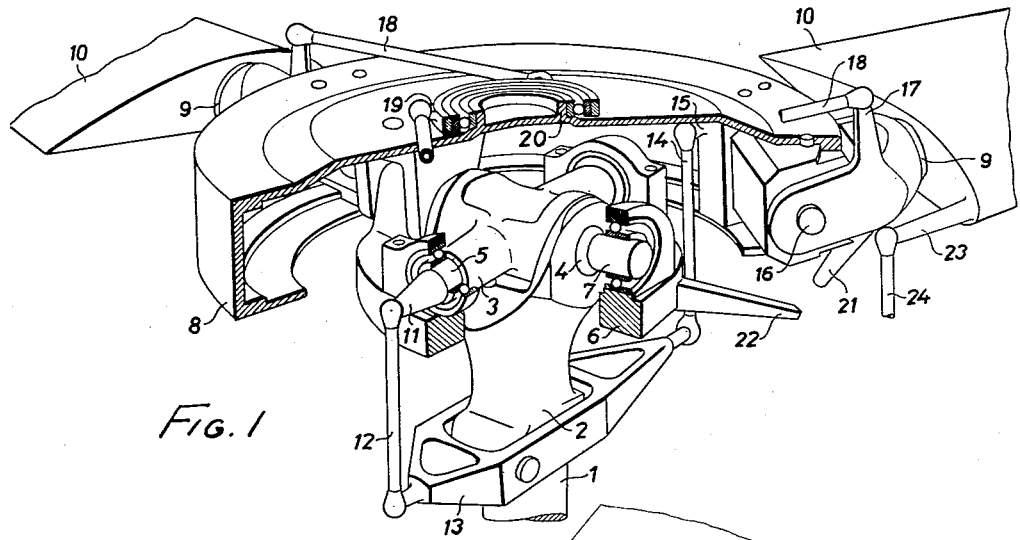
Fig. 1 is a perspective view which is partly broken away and in section, and which shows a rotor head from which three rotor blades are suspended by horizontal pins.

Referring to Fig. 1, it will be seen that the rotor shaft 1 terminates in a fork 2 which supports the pins 4 of a first cross system 3. The pins 5 of the system 3 are supported by eyelets of a second cross system 6 which, for reasons of design, has the shape of a crown. The above elements, that is, the fork 2, the first cross system 3 and the crown 6 form the first universal joint. The second cross system, that is, the crown 6, is connected by pins 7 with a frame 8 forming a rotor beam which is common to all the blades, that is, a beam without vertical pins. The first cross system 3, the second cross system 6 and the frame 8 form the second universal joint. In the first and second universal joints, the pins 4 of the first universal joint and the pins 7 of the second universal joint are in the same azimuth position with respect to the shaft, that is, their axes lie in the same plane passing through the axis of shaft 1 and the elements 3, 5 and 6 are common to both universal joint systems, so that both the cross system 3 and 6 have no intermediate links other than the connecting pins.

Therefore, there are two superposed universal joints with a zero shaft length between these joints, since the cross system 3 of the first universal joint is directly and concentrically connected with the cross system or crown 6 of the second universal joint. The function of the omitted shaft between both universal joints is performed by a mechanism connecting one of the common pins 5 of the first and second cross systems with the frame 8 of the rotor beam, and including a pivot connection 11 between that pin 5 and a link 12, a lever 13 connected, at one end, to link 12 and at its other end, to a link 14 which is, in turn, connected to frame 8 by a pivot connection 15. The lever 13 is pivoted on the fork 2 of the rotor shaft 1, and the length of its arms and the radial distances of the pivot connections 11 and 15 for the links 12 and 14 from the axis of the rotor shaft 1 and from the center of the double universal joint are chosen so that, in case of a tilting of the frame 8 through a certain angle α around the axis of the pin 7, the mechanism composed of the elements 15, 14, 13, 12 and 11 tilts both cross systems 3 and 6 in the same direction around the pins 4 through half the angle of tilting of the frame, that is, through the angle α/2.

If, for example, as shown in the drawing, the distances of the upper and lower pivot pins of both links 12 and 14 from the center of both universal joints are equal, the length of the arm of the lever 13 for the link 12 is half the length of corresponding arm for the link 14.

The frame 8 of the rotor support has bearings carrying horizontal pins 16 on which the rotor blades 10 are suspended by butt arms 9 to flap upwards and downwards within the range permitted by suitable stops. The butt arm 9 of each blade has a suspending fork provided with an arm 17 which is connected by a link 18 with a multiarm lever 19 pivoted at 20 in the center of the frame. All links 18 are connected to the lever 19 in such a manner that all blades are either simultaneously lifted or lowered with respect to the frame 8. Thus, it is established that the plane of the frame 8 is coincident with the plane of the rotor disc.

Figure 2:
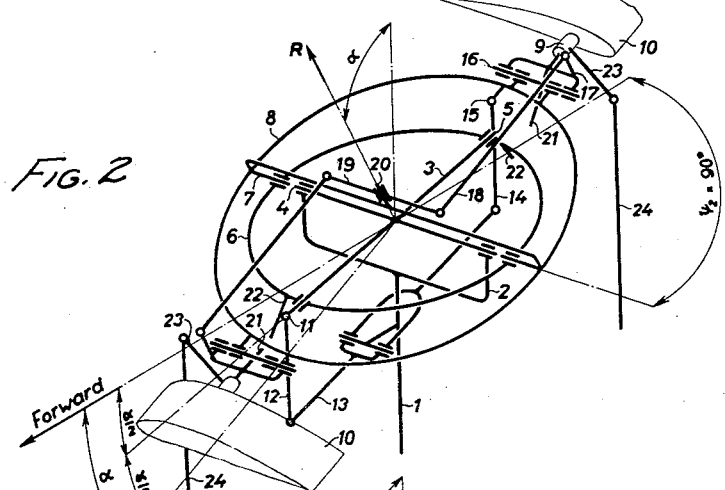
Fig. 2 is a schematic view of a rotor head similar to that of Fig. 1, but showing only two rotor blades for the sake of simplicity, and with such blades having their longitudinal axes extending in the direction of flight.

The mutual connection of the arms 17 of the forks of the butt arms 9 guarantees that their flapping movements are symmetrical with respect to the frame 8. The number of the blades arranged on the rotor hub is not limited and there may be two blades as in Figs. 2 and 3, or more than two blades, as in Fig. 1.

In order to ensure that the tips of the blades will not come too low, and thereby endanger the crew and the fuselage when the aircraft is on the ground with the blades hanging down and the rotor tilted, projections 21 are arranged upon the forks of the butt arms 9 and the crown 6 of the secondary universal joint is provided with abutments 22 engageable by projections 21. The differential movement of the frame 8 and the crown 6 enables the projections 21 and abutments 22 to limit the lower extreme position of the blades 10 to the same lowest position for each flapping angle of the rotor blades.

The rotor blades 10 suspended by butt arms 9 are controlled by a lever 23 and a bar 24 by any known system of pilot control.

The pilot changes the pitch of the rotor blades by displacing the lever of the cyclic control from the central position, and these blades thereafter rotate in a plane which is at a certain angle α to the plane perpendicular to the axis of the rotor shaft. It is possible to replace the rotor pull by a resultant force R which lies approximately in the axis of rotation of the rotor disc so that this force is also disposed at the angle α with respect to the axis of the rotor shaft.

The connecting pins 5 of both cross systems 3 and 6 are forcibly moved due to the action of the elements 11, 12, 13, 14 and 15 into a plane halving the angle α between the rotor disc and a plane perpendicular to the axis of the rotor shaft 1. From the schematic Figs. 2 and 3 (representing a two bladed rotor) the forced movement of these connecting pins 5 and the tilting of both cross systems 3 and 6 is obvious. The rotor disc deviated by the angle α brings the central frame 8 into the plane of said disc by the action of the lever arms 17 of the blade supports. The frame 8 controls the pivot connection 11 on the common pin 5 of both cross systems by means of the element 15, the links 14 and 12 and the lever 13. As already stated, this mechanism tilts the cross systems 3 and 6 around the pins 4 through half the angle through which the frame 8 has tilted around the pins 7. This causes the correct functioning of the rotor head, as it is desirable that the deviated rotor rotate as uniformly as the rotor shaft. Otherwise, a non-uniform movement of the rotor mass would originate torsional oscillations, which would be transmitted by the rotor shaft to the whole aircraft as the main source of vibrations. In the position according to Fig. 2, where the pin 4 of the fork 2 is perpendicular to the direction of flight and both cross systems 3 and 6 are in the plane tilted through one-half the angle of tilt of frame 8, the instantaneous direction of the forced movement of the connecting pins 5 is parallel both to the plane of rotation of the pins 4, that is, to the plane perpendicular to the axis of the shaft, and to the plane of rotation of the pins 7, that is, to the plane of the rotor disc, and has therefore the same angular velocity $$\omega_5 = \omega_1 = \omega_{10}$$

in which the indexes of the angular velocities correspond to the reference numerals of the related parts in this description.

Figure 3:
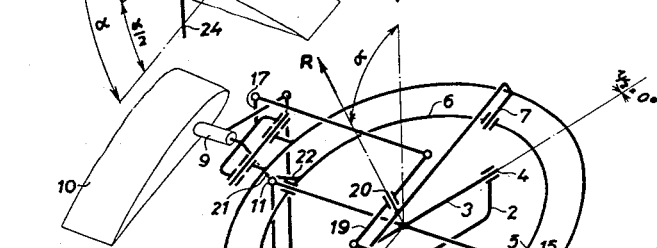
Fig. 3 is a view similar to that of Fig. 2, but with the blades turned so that their longitudinal axes extend perpendicular to the direction of flight.
Figure 3:
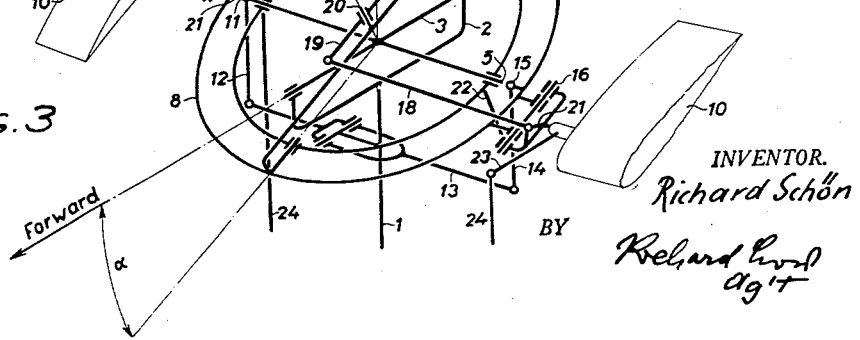

During further rotational movement, both cross systems 3 and 6 deviate with respect to each other around the axis of the pins so that the first cross system 3 approaches the plane perpendicular to the axis of the shaft 1 due to the action of the pins 4 and the second cross system 6 approaches the plane of the rotor disc, that is, the plane of the frame 8, due to the action of the pins 7. Coincidence of the planes of the cross systems 3 and 6 with the plane perpendicular to shaft 1 and the plane of frame 8, respectively, occurs, as shown in Fig. 3, when the pins 4 of the fork 2 are in the direction of flight. In this position, the momentary direction of the movement of the pins 5 is inclined at the same angle $\alpha/2$ both to the plane perpendicular to the shaft axis, and to the plane of the rotor disc or frame 8, as the pins 5 are then exactly in the line of intersection of both planes. Then, the angular velocity of the pins 5 and of the rotor shaft 1 will be $$\omega_5 = \frac{\omega_1}{\cos \alpha/2} \omega_1 = \omega_5 \cos \alpha/2$$

and the angular velocity of the rotor blades 10 will be $$\omega_{10} = \omega_5 \cos \alpha/2$$

or again $$\omega_1 = \omega_5 \cos \alpha/2 = \omega_{10}$$

It is thus obvious, that the angular velocities of the rotor shaft $\omega_1$ and of the rotor blades $\omega_{10}$ are equal throughout the entire revolution of the rotor. If only one cross system is used, as is the case in single universal joints, the angular velocity of the rotor blades would be $$\omega'_{10} = \omega_1 \frac{\cos \alpha}{1 - \sin^2 \alpha \cos^2 \psi_2}$$

where $\psi_2$ is the azimuth angle of the position of the fork 2 measured from the rear position in the direction of flight.

What I claim is:

1. A rotor hub for helicopter aircraft comprising a shaft having a fork at its upper end, a first universal member having first and second pins at right angles to each other, said first pins being pivotally mounted in said fork for swinging of said first universal member relative to said shaft about an axis perpendicular to the latter, a second universal member pivotally mounted on said second pins and, in turn, carrying diametrically opposed pins having their axes lying in the plane passing through the axis of said shaft and the axis of said first pins, a frame pivotally mounted on said pins of the second universal member so that said fork, first and second universal members and frame form a double universal joint system having a common tilting axis defined by said second pins of the first universal member, rotor blades mounted on said frame, and means connected between one of said second pins and said frame to move said common tilting axis into a plane which bisects an angle between a plane perpendicular to the axis of said shaft and the plane of said frame upon deviation of the latter from said plane perpendicular to the shaft axis.

2. A rotor hub as in claim 1; wherein said frame has pivot pins lying in said plane thereof, and said rotor blades are pivotally mounted on said pivot pins of the frame for flapping with respect to the latter.

3. A rotor hub as in claim 2; wherein said means connected between one of said second pins and said frame includes a double-armed lever pivotally mounted on said shaft, and first and second links pivotally connected to the opposite ends of said lever and to said one second pin and said frame, respectively.

4. A rotor hub as in claim 2; wherein each of said rotor blades has a butt arm engaging the related pivot pin of said frame for mounting said blade on said pivot pin; and further comprising a projection on each butt arm, and an abutment on said second universal member for each blade which is engageable by said projection of the related butt arm to limit the downward flapping of the blades.

5. A rotor hub as in claim 4; further comprising an extension on each butt arm, a multi-armed lever on said frame turnable about an axis perpendicular to said plane of the frame, and a link pivotally connecting said extension of each butt arm with a related arm of said multi-armed lever so that said blades are made to flap equally about said horizontal pivot pins of the frame.

6. A rotor hub for helicopter aircraft comprising an elongated drive shaft, a first universal member having first and second pivot means defining two axes at right angles to each other, said first pivot means being mounted on said drive shaft for swinging of said first universal member relative to said shaft about one of said axes, said one axis being substantially perpendicular to the direction of elongation of said drive shaft, a second universal member pivotally mounted on said second pivot means, and, in turn, carrying diametrically opposed pivot means defining an axis lying in the plane passing through the axis of said shaft and the axis of said first pivot means, frame means pivotally mounted on said pivot means of said second universal member so that said shaft, first and second universal members form a double universal joint system having a common tilting axis defined by said second pivot means of said first universal member, rotor blades mounted on said frame means, and means connected between said second pivot means and said frame means to move said common tilting axis into a plane which bisects an angle between a plane perpendicular to the direction of elongation of said shaft and the plane of said frame means upon deviation of the latter from said plane perpendicular to the direction of elongation of said shaft.

References Cited in the file of this patent

UNITED STATES PATENTS

| | | |
|---|---|---|
| 1,899,170 | Wainwright | Feb. 28, 1933 |
| 2,217,107 | Focke | Oct. 8, 1940 |
| 2,256,635 | Young | Sept. 23, 1941 |
| 2,440,225 | Pullin | Apr. 20, 1948 |
| 2,614,640 | Buivid | Oct. 21, 1952 |
| 2,631,679 | Hiller | Mar. 17, 1953 |
| 2,633,924 | Young | Apr. 7, 1953 |
| 2,827,777 | Molyneux | Mar. 25, 1958 |